No. 694,542. Patented Mar. 4, 1902.
J. P. GORTON.
TELEGRAPHY.
(Application filed Oct. 31, 1901.)
(No Model.)
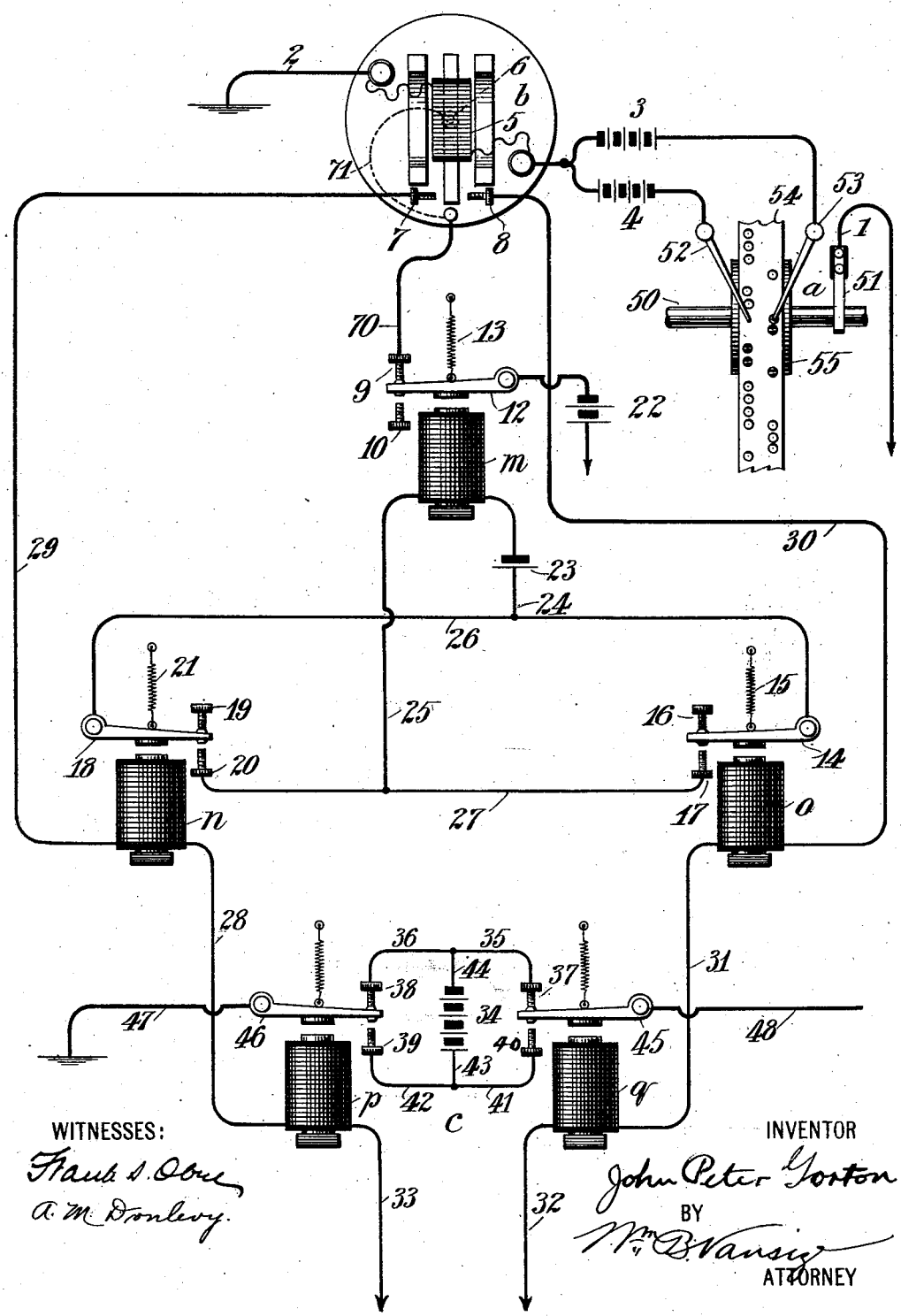
WITNESSES:
INVENTOR
John Peter Gorton
BY
ATTORNEY

UNITED STATES PATENT OFFICE.

JOHN PETER GORTON, OF WESTON-SUPER-MARE, ENGLAND.

TELEGRAPHY.

SPECIFICATION forming part of Letters Patent No. 694,542, dated March 4, 1902.

Application filed October 31, 1901. Serial No. 80,715. (No model.)

*To all whom it may concern:*

Be it known that I, JOHN PETER GORTON, a subject of the King of Great Britain, residing at St. Keverne, Weston-super-Mare, England, have made certain new and useful Improvements in Telegraphy, of which the following is a specification.

The object of my invention is to provide an improved arrangement of apparatus for repeating from one main circuit into another where the first circuit is subject to retardation from static induction. I so arrange the apparatus that successive current impulses arriving at the repeating-station will be transmitted in the form of well-defined impulses— that is to say, the received impulse or impulses will be determined and repeated or transmitted as uniform well-defined sharply-outlined impulses instead of being "tailed" or run into each other, as was the received impulse or impulses and as is frequently the case where interference from static induction is encountered. In the first main line there is an automatic transmitter, sometimes called a "machine-transmitter," at the sending-station and a suitable sensitive relay at the receiving-station. At this station there is also an electromagnetic transmitter operating in the second main-line circuit. The relay repeating-points and the electromagnets operating the transmitter are in a local circuit. I provide means connected with this circuit whereby the current impulses will be autodetermined—that is to say, a current impulse in the transmitter local circuit will be of such an arbitrary length or duration as may be determined upon and as shall conform to the transmitted impulses due to the automatic transmitter at the distant station irrespective of the indefinite character of the arriving impulses and the "tailing" due to static induction. This means consists of a normally closed circuit-breaker in the transmitter-circuit, an electromagnet with its local circuit to operate this circuit-breaker, and a device like a separate electromagnet or its equivalent in the transmitter-circuit to control the last-named circuit-breaker. When the relay closes on its contact-points, it will close the transmitter-circuit, and the transmitter-circuit will be automatically broken at the end of the arbitrary period assigned to a current impulse. The same operation is repeated as long as the relay contact-points remain closed.
I regulate this interval by electromagnetic reluctance and adjustment of the retracting-springs of the electromagnets employed.

The accompanying drawing illustrates my invention.

*a* is an automatic or machine transmitter at the distant station.

*b* is a polarized relay at the repeating-station.

The transmitter *a* and relay *b* are in the main-line circuit 1 2. The transmitter *a* has a motor-driven shaft 50, revolving the drum 55, of conducting material, at a constant and uniform speed.

54 is the perforated tape having two lines of perforations for positive and negative current impulses. The contact-fingers 52 and 53 are fixed in position to make contact with the drum 55 whenever a perforation in the tape 54 is passed. Finger 52 is connected to the terminal of the battery 4. Finger 53 is connected to the terminal of battery 3 of opposite polarity. The other terminals of both batteries are connected to the main line 2. The drum 55 is connected to ground through the contact-brush 51 and the main-line fragment 1. The main line 1 2 may be a submarine or underground cable or a suspended conductor subject to static induction. The relay *b* at the repeating-station has its coil 5 connected in the main line 1 2. Coil 5 is on the vertical pivots 6. It has a permanently-magnetic core and two electric contact-points 7 and 8.

*c* is an electromagnetic pole-changing transmitter. It is located at the repeating-station and is operated by the relay *b*. The transmitter *c* has two circuit-changing arms 45 and 46, operated by the electromagnets *q* and *p*. The arm 45 is connected to the divided terminal of the main line 48. The arm 46 is connected to the divided terminal of the main line 47.

34 is a main-line battery. One terminal of battery 34 is connected to contact-point 37 by the wires 35 and 44. The other pole of said battery is connected to contact-point 40 by wires 41 and 43. The same pole of said battery is also connected to contact-point 39 by conductors 42 and 43. The opposite pole of battery 34 is connected to contact-point 38 by wires 36 and 44. When magnet $q$ attracts arm 45, the positive pole of the battery is connected to the line and the opposite or negative pole to ground. When magnet $p$ attracts arm 46, the negative pole of battery 34 is connected to line. Magnet $q$ is connected to relay-contact 8 by conductors 30, 31, and 32. Magnet $p$ is connected to relay-contact 7 by conductors 29, 28, and 33.

22 is the local transmitter-battery. One terminal is grounded and the opposite terminal is electrically connected to the circuit-breaker 12, normally resting on its contact 9. The stop 9 is connected to the armature of relay $b$ by conductors 70 71. The circuit-breaker 12 is normally held in contact with stop 9 by retracting-spring 13. Circuit-breaker 12 is operated by electromagnet $m$. Magnet $m$ is in a local circuit with battery 23. This circuit has two branches, in each of which there is a circuit-breaker controlled by the magnets $n$ and $o$, respectively. Magnet $o$ controls spring-retracted arm 14, having contacts 16 and 17.

15 is an adjustable retracting-spring. Magnet $n$ controls arm 18, which is retracted by spring 21 and operates between the contact-points 19 and 20. The two contacts 17 and 20 are united by the conductor 27. The two arms 14 and 18 are united by the conductor 26. Magnet $m$ is in conductor 24 25, uniting the wires 26 and 27 and including local battery 23. The coils of magnet $o$ are in circuit with transmitter-magnet $q$, and the coils of magnet $n$ are in circuit with transmitter-magnet $p$.

The operation of the apparatus is as follows: Let us assume that the transmitter $a$ is throwing uniform impulses upon the line in positive and negative groups and that they arrive at the relay $b$ without well-defined division or "tailed," as it is called. When the armature of relay $b$ closes upon contact 8, local circuit is completed from battery 22 via 12, 9, 70, 71, 8, 30, coil of $o$, 31, coil of $q$, 32, and return to 22. Transmitter-arm 45 is drawn down by magnet $q$. Arm 45 makes contact with 40, and the positive pole of the battery 34 is connected to line. The negative pole of 34 is to ground through the main-line fragment 47. Immediately following the closing of 45 upon 40 magnet $m$ has attracted its arm 12 and broken the local circuit of the battery 22. This break occurred after a time interval or as soon as magnet $o$ could attract its armature-bar 14 and the break between 14 and 16 could become effective in the coils of magnet $m$—that is, there was consumed so-called "armature time," or time for the armatures and magnets to operate. This is also called "electromagnetic reluctance." This time may be regulated and varied by adjusting the springs 13 and 15 of the armatures of magnets $m$ and $o$ and also by varying the construction and adjustment of magnets $m$ and $o$, so as to increase or decrease the time of charge and discharge. As long as the relay repeating-points are closed at 8 the operation last described is repeated, the automatic breaks occurring at determinate intervals, which intervals should be and are made to correspond to the normal dot interval of the automatic transmitter $a$. When the transmitted impulses in line 1 2 are of opposite polarity, the relay closes on point 7, the local circuit extending from battery 22 via 12, 9, 70, 71, 29, coil of magnet $n$, 28, coil of magnet $p$, 33, and return to 22. Transmitter-magnet $p$ attracts its armature-bar 46, and an impulse of opposite polarity to that first described is thrown upon the line 47 and 48. This is due to the arm 46 closing upon the down contact 39; but the arm 18, controlled by magnet $n$, closes contact at 20 to complete the local circuit of battery 23. Through the coil of magnet $m$ via 25, 20, 18, 26, and 24 coil of magnet $m$ is energized, arm 12 is attracted, the local circuit through the magnet $p$ is broken automatically, as in the first instance described, and the extent of the current impulse is thus defined and limited. This automatic determination of current impulses will continue in regular succession by automatic action as long as the relay-contact remains closed on 7.

The circuit-breaker 12 in the transmitter-circuit, operated by magnet $m$ in a separate local circuit, including circuit-breakers like 14 and 18, with magnets $n$ and $o$, constitutes a means for automatically making and breaking the transmitter-circuit at regular predetermined intervals, while the relay-contact remains closed. Of course the circuit-breaker 18 could be operated by magnet $p$ and the circuit-breaker 14 could be operated by magnet $q$; but I regard this as an obvious modification inferior to the preferred arrangement shown, because in the latter case the time interval would be limited by the reluctance and adjustment of the single magnet $m$ only, while with preferred form the magnet $o$ may be caused to operate with greater reluctance than the magnet $q$, and so augment the time interval beyond that possible with a single magnet like $m$.

What I claim, and desire to secure by Letters Patent, is—

1. In a telegraph-repeater the combination with two circuits of an automatic transmitter and a relay in one circuit, an electromagnetic pole-changing transmitter in the second circuit, a local circuit including the relay repeating-points, the coils of said transmitter-magnet, and an independent normally closed circuit-breaker, and automatic means for operating said circuit-breaker at regular intervals during the time the relay-contact is closed.

2. In a telegraphic repeater the combination of a main line, an automatic transmitter, and a relay in said line, a second main line, a transmitter in said line, an electromagnet to operate said transmitter, a primary local circuit containing said magnet and the relay repeating-points, a normally closed circuit-breaker in the primary local circuit, an electromagnet to operate said circuit-breaker, a secondary local circuit including said magnet and a circuit-breaker and an electromagnet to operate said circuit-breaker controlled by the primary local circuit.

3. In a telegraphic repeater, a main line, an automatic transmitter and a relay in said line, a second main line, a transmitter in said line, a local transmitter-circuit including the relay repeating-points and a magnet to operate said transmitter combined with means for determining the current impulses consisting of a normally closed circuit-breaker in the transmitter-circuit, an electromagnet to operate said circuit-breaker, a local circuit for said magnet and a circuit-breaker in said circuit controlled by a magnet in the transmitter local circuit.

4. The combination with two circuits of a suitable transmitter and a relay in one circuit, an electromagnetic pole-changing transmitter in the second circuit, a local circuit including the relay repeating-points, the coils of said transmitter-magnet, and an independent normally closed circuit-breaker, and automatic means for operating said circuit-breaker at regular intervals during the time the relay-contact is closed.

Bristol, England, August 8, 1901.

JOHN PETER GORTON.

Witnesses:
   W. C. H. CROSS,
   JNO. J. DODD.